(12) United States Patent
Wang et al.

(10) Patent No.: US 9,787,227 B1
(45) Date of Patent: Oct. 10, 2017

(54) CONTROLLED INDUCTIVE SENSE SYSTEM

(71) Applicant: Marvell International Ltd., Hamilton (BM)

(72) Inventors: Yichao Wang, Singapore (SG); Kong Yin Leong, Singapore (SG); Ravishanker Krishnamoorthy, Singapore (SG)

(73) Assignee: Marvell International Ltd., Hamilton (BM)

( * ) Notice: Subject to any disclaimer, the term of this patent is extended or adjusted under 35 U.S.C. 154(b) by 272 days.

(21) Appl. No.: 14/599,828

(22) Filed: Jan. 19, 2015

Related U.S. Application Data

(60) Provisional application No. 61/931,462, filed on Jan. 24, 2014.

(51) Int. Cl.
*H02K 29/06* (2006.01)
*H02P 6/00* (2016.01)
*H02P 6/18* (2016.01)
*H02P 6/185* (2016.01)
*H02P 6/182* (2016.01)
*H02P 6/20* (2016.01)

(52) U.S. Cl.
CPC ............... *H02P 6/002* (2013.01); *H02P 6/18* (2013.01); *H02P 6/182* (2013.01); *H02P 6/185* (2013.01); *H02P 6/20* (2013.01)

(58) Field of Classification Search
CPC .. H02P 6/182; H02P 6/185; H02P 6/18; H02P 6/20; H02P 6/085
USPC ..................................................... 318/400.32
See application file for complete search history.

(56) References Cited

U.S. PATENT DOCUMENTS

| 6,091,222 A * | 7/2000 | Vertemara | H02P 6/21 |
| | | | 318/254.2 |
| 2010/0181952 A1* | 7/2010 | Cheng | H02P 6/20 |
| | | | 318/400.33 |
| 2012/0319631 A1* | 12/2012 | Tieu | H02P 6/186 |
| | | | 318/400.11 |

* cited by examiner

*Primary Examiner* — Kawing Chan
*Assistant Examiner* — Bradley Brown

(57) ABSTRACT

An apparatus includes a driver circuit and a motor control circuit. The driver receives first and second supply voltages and a control signal, and generates a target voltage on an output terminal according to the control signal. The motor control circuit is configured to generate the control signal and measure a rise time of a current of the driver circuit during a period of time in which the output terminal is at the target voltage. A method includes, during a time interval, providing the first supply voltage on an output of a first driver circuit, generating a target voltage on an output of a second driver circuit, and measuring a rise time of a current flowing between the outputs of the first and second driver circuits. For both the apparatus and method, the target voltage is between and substantially different from the first and second supply voltages.

18 Claims, 6 Drawing Sheets

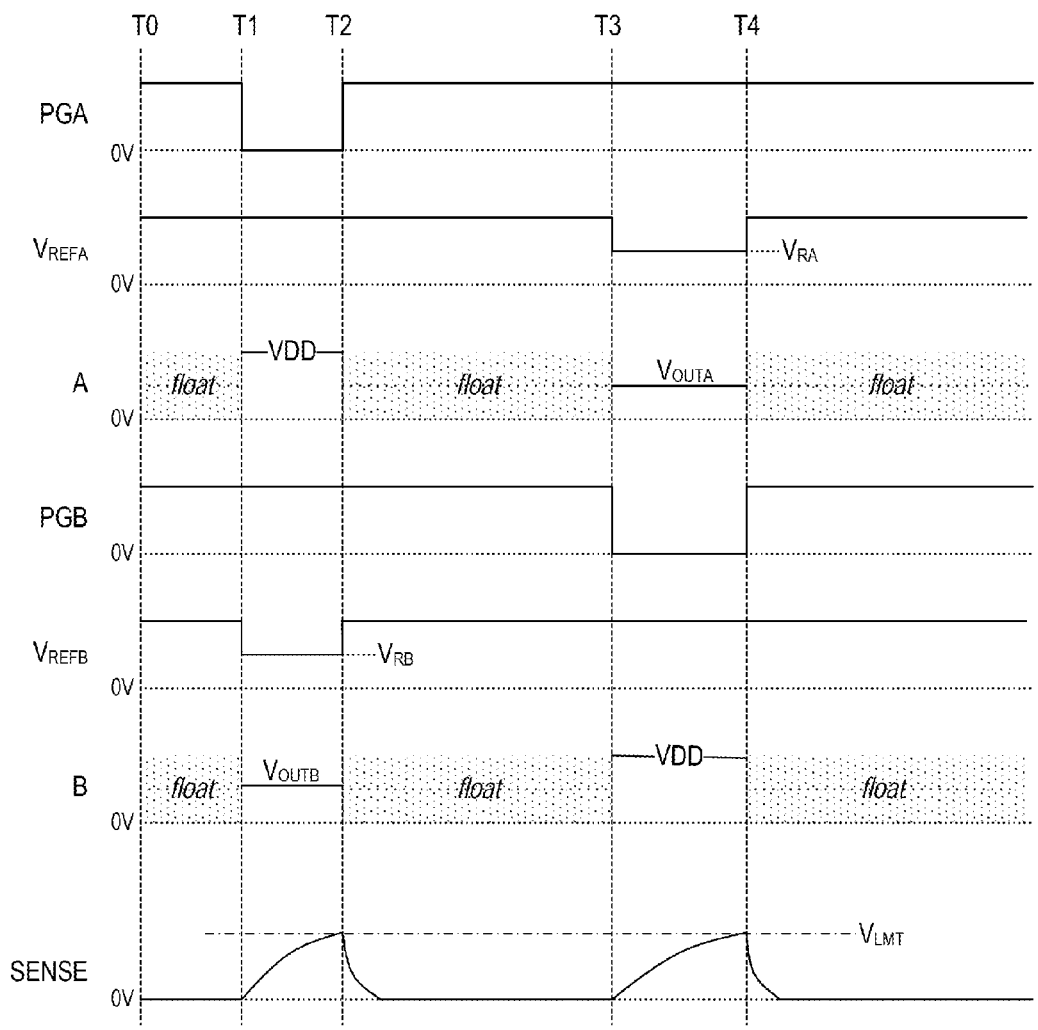

CONTROLLED INDUCTIVE SENSE SYSTEM

CROSS REFERENCE TO RELATED APPLICATION

This present disclosure claims the benefit of U.S. Provisional Application No. 61/931,462, filed on Jan. 24, 2014, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Brush-Less Direct Current (BLDC) motors, also known as electronically commutated synchronous motors, use electronic commutation to control magnetic fields in a stator that cause movement of a rotor. Motor control circuits sense a rotational position of the rotor, herein referred to as the position of the rotor, to control timings of the electronic commutation.

In some BLDC motors, sensors such as of Hall-effect sensors are used to determine the position of the rotor. In contrast, sensorless BLDC motors may use Back-Electro-Motive Force (Back-EMF) detection to determine the position of the rotor while the rotor is moving.

However, during a start-up period in which the rotor is stationary or moving very slowly, Back-EMF is weak, and additional techniques may be used for reliable spin-up of the BLDC motor. One such technique is inductive sense.

Inductive sense determines a position of a magnet according to differences in an inductance of a coil caused by a proximity and a polarity of the magnet relative to the coil. Because a rotor of a BLDC motor acts as a magnet, a motor controller may determine a position of the rotor relative to one or more coils of the BLDC motor by measuring an inductance of the one or more coils.

SUMMARY

In an embodiment, an apparatus includes a driver circuit and a motor control circuit. The driver circuit includes an output terminal and is configured to receive first and second supply voltages and a control signal, and generate a target voltage on the output terminal according to the control signal. The target voltage is between the first and second supply voltages and substantially different from each of the first and second supply voltages. The motor control circuit is configured to generate the control signal, and measure a rise time of a current of the driver circuit during a period of time in which the output terminal is at the target voltage.

In an embodiment, the driver circuit is configured to generate the target voltage on the output terminal when the control signal includes a first value, and provide the first supply voltage to the output terminal when the control signal includes a second value.

In an embodiment, the motor control circuit is configured to determine a position of a rotor of an electric motor according to the rise time.

In an embodiment, the driver circuit is a first driver circuit, the output terminal is a first output terminal, the control signal is a first control signal, the rise time is a first rise time, and the apparatus further includes a second driver circuit including a second output terminal. The second driver circuit is configured to receive the first and second supply voltages and a second control signal, and generate a second target voltage on the second output terminal according to the second control signal. The second target voltage is between the first and second supply voltages and substantially different than each of the first and second supply voltages. The motor control circuit is configured to generate the second control signal, and measure a second rise time of a current of the second driver circuit during a period of time in which the second output terminal is at the second target voltage.

In an embodiment, the apparatus includes a Brush-Less Direct-Current (BLDC) motor having a winding connected to the output terminal.

In an embodiment, the apparatus is provided in an integrated circuit.

In an embodiment, an apparatus includes a first transistor, a second transistor, and a feedback circuit. The first transistor includes a first terminal connected to a first supply voltage, a second terminal connected to an output terminal, and a control terminal connected to a first control signal. The second transistor includes a first terminal connected to the output terminal and a second terminal connected to a second supply voltage. The feedback circuit has a first input connected to the output terminal, a second input connected to a second control signal, and a feedback output connected to a control terminal of the second transistor. The first transistor provides the first supply voltage to the output terminal when the first control signal has a first value. The second transistor and the feedback circuit are configured to generate a target voltage on the output terminal when the second control signal has a second value. The target voltage is between the first and second supply voltages and substantially different from the first and second supply voltages.

In an embodiment, a method includes providing first and second supply voltages to first and second driver circuits, and during a time interval: providing the first supply voltage on an output of the first driver circuit, generating a target voltage on an output of the second driver circuit, and measuring a rise time of a current flowing between the outputs of the first and second driver circuits. The target voltage is between the first and second supply voltages and substantially different from each of the first and second supply voltages.

In an embodiment, the target voltage is a first target voltage, the time interval a first time interval, the rise time a first rise time, and the current a first current. The method further includes, during a second time interval: providing the first supply voltage on the output of the second driver circuit, generating a second target voltage on the output of the first driver circuit, and measuring a second rise time of a second current flowing between the outputs of the first and second driver circuits. The second target voltage is between the first and second supply voltages and substantially different from each of the first and second supply voltages.

In an embodiment, the target voltage is a first target voltage, the rise time a first rise time, and the current a first current. The method further includes providing the first and second supply voltages to a third driver circuit, and during a second time interval: providing the first supply voltage on an output of the third driver circuit throughout the entire second time interval, generating a second target voltage on the output of the first driver circuit throughout the second time interval, and measuring a second rise time of a second current flowing between the outputs of the first and third driver circuits. The second target voltage is between the first and second supply voltages and substantially different than each of the first and second supply voltages.

BRIEF DESCRIPTION OF THE DRAWINGS

FIG. 7 is a waveform diagram illustrating an operation of the single-phase BLDC motor system of FIG. 5 according to an embodiment.

DETAILED DESCRIPTION

Figure 1A:
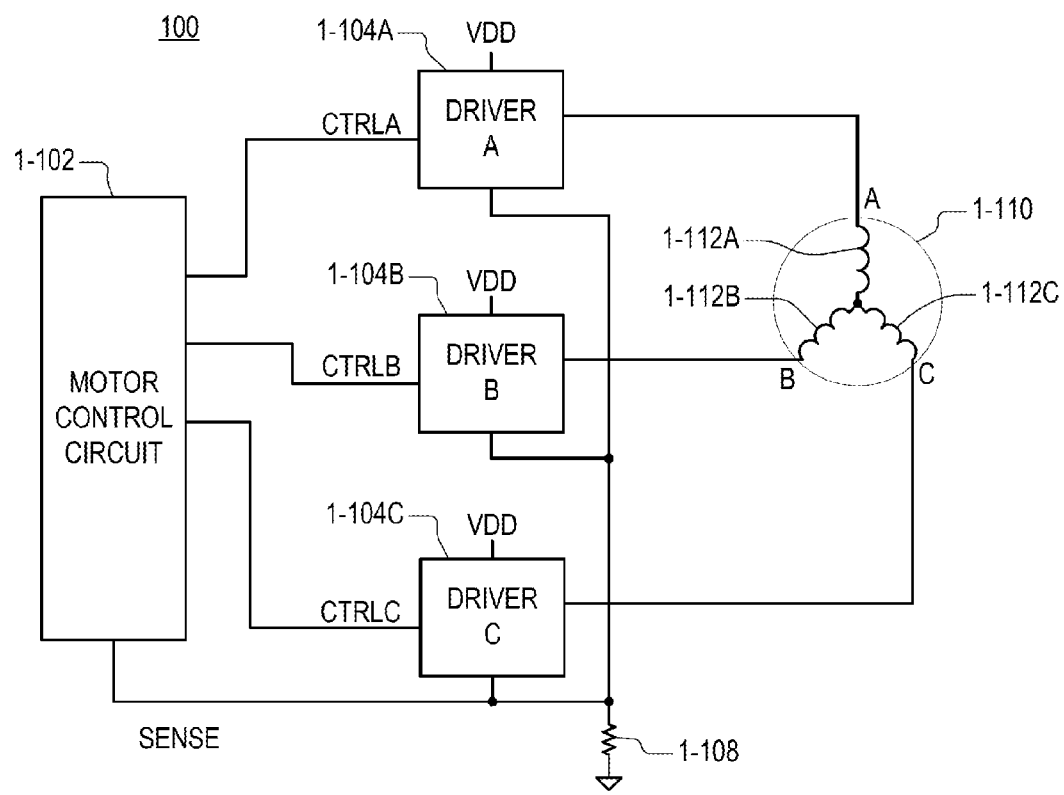
FIG. 1A illustrates a three-phase BLDC motor system according to an embodiment.

FIG. 1A illustrates a three-phase Brush-Less Direct Current (BLDC) motor system 100 according to an embodiment. The BLDC motor system 100 includes a motor control circuit 1-102, first, second, and third driver circuits 1-104A, 1-104B, and 1-104C, a current sense resistor 1-108, and a three-phase BLDC motor 1-110.

The motor control circuit 1-102 provides first, second, and third control signals CTRLA, CTRLB, and CTRLC to the first, second, and third driver circuits 1-104A, 1-104B, and 1-104C, respectively. In an embodiment, each of the first, second, and third control signals CTRLA, CTRLB, and CTRLC includes a plurality of signals. The motor control circuit 1-102 senses a current flow through one or more of the first, second, and third driver circuits 1-104A, 1-104B, and 1-104C by measuring a voltage across the current sense resistor 1-108.

The first, second, and third driver circuits 1-104A, 1-104B, and 1-104C are each connected to a supply voltage VDD and connected to a ground through the current sense resistor 1-108. The first, second, and third driver circuits 1-104A, 1-104B, and 1-104C control first, second, and third signals supplied to first, second, and third motor terminals A, B, and C of the motor 1-110, respectively. The current sense resistor 1-108 is used to produce a current sense signal SENSE that is monitored by the motor control circuit 1-102.

The motor 1-110 includes first, second, and third windings 1-112A, 1-112B, and 1-112C having first ends connected to the first, second, and third motor terminals A, B, and C, respectively. Second ends of the first, second, and third windings 1-112A, 1-112B, and 1-112C are connected to each other in a "wye" configuration. In another embodiment, the first, second, and third windings 1-112A, 1-112B, and 1-112C are connected to each other in a "delta" configuration wherein the second ends of the first, second, and third windings 1-112A, 1-112B, and 1-112C are connected to the first ends of the second, third, and first windings 1-112B, 1-112C, and 1-112A, respectively.

Figure 1B:
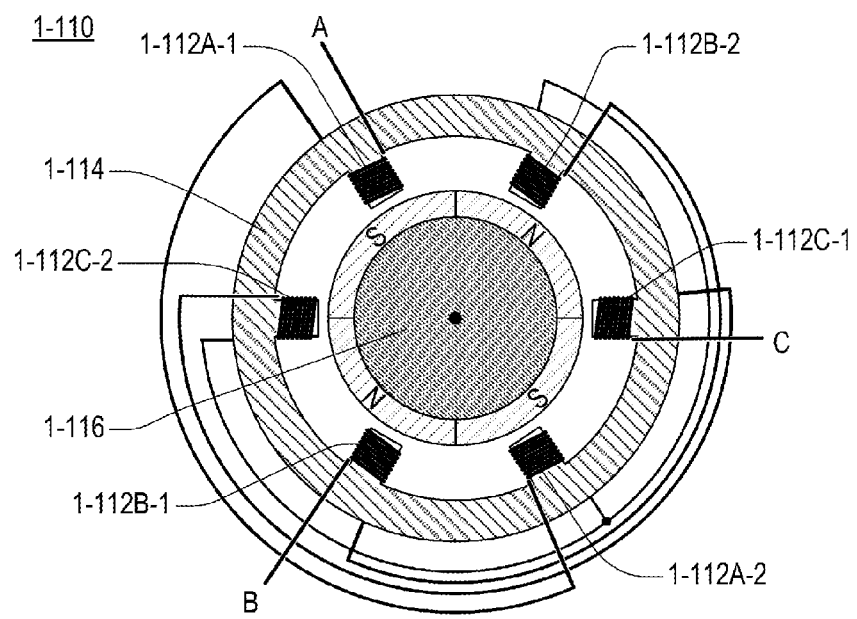
FIG. 1B illustrates additional features of a three-phase BLDC motor of FIG. 1A according to an embodiment.

FIG. 1B is a simplified cross-sectional drawing that illustrates additional features of the motor 1-110 according to an embodiment.

The motor 1-110 includes a stator 1-114. Wound on the stator 1-114 are first and fourth coils 1-112A-1 and 1-112A-2 which are connected in series to form the first winding 1-112A, second and fifth coils 1-112B-1 and 1-112B-2 which are connected in series to form the second winding 1-112B, and third and sixth coils 1-112C-1 and 1-112C-2 which are connected in series to form the third winding 1-112C.

The motor 1-110 further includes a rotor 1-116 having one or more magnets, each magnet including a north pole and a south pole.

A person of skill in the art would understand that the BLDC motor system 100 may further include other circuits, such as back-EMF monitoring circuits. Such circuits are omitted in the interest of brevity. In an embodiment, all or part of the motor control circuit 1-102 and the first, second, and third driver circuits 1-104A, 1-104B, and 1-104C are provided in an integrated circuit.

Figure 2:
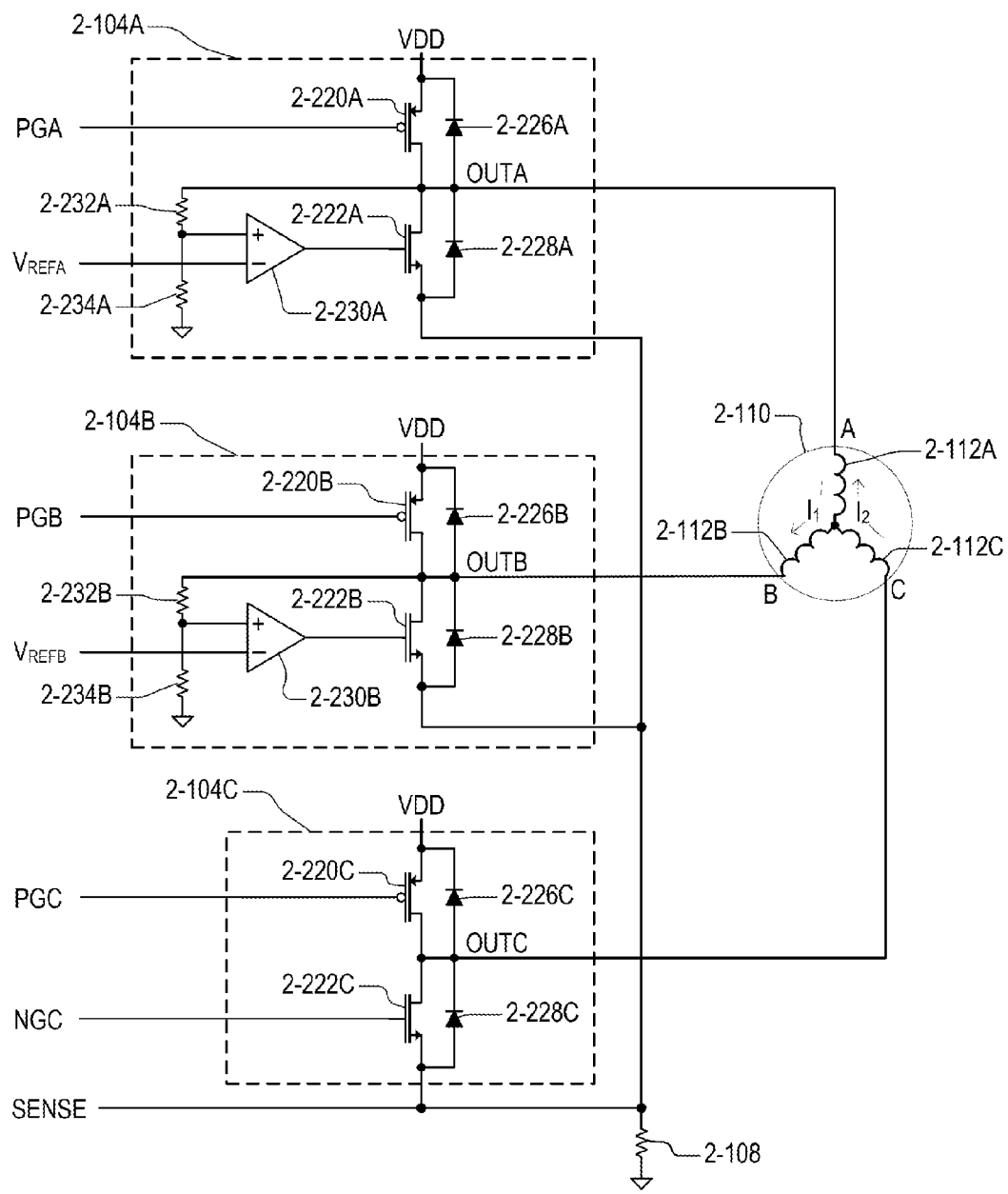
FIG. 2 illustrates driver circuits of the three-phase BLDC motor system of FIG. 1A according to an embodiment.

FIG. 2 illustrates further details of first, second, and third driver circuits 2-104A, 2-104B, and 2-104C suitable for use as the first, second, and third driver circuits 1-104A, 1-104B, and 1-104C, respectively, of the BLDC motor system 100 of FIG. 1A according to an embodiment.

The first driver circuit 2-104A receives a first positive gate signal PGA and a first reference voltage signal $V_{REFA}$. These signals may be included in the first control signal CTRLA of FIG. 1A.

The first positive gate signal PGA is connected to a gate of a first p-channel Metal-Oxide-Semiconductor Field-Effect Transistor (pMOSFET) 2-220A. A source of the first pMOSFET 2-220A is connected to a supply voltage VDD. A drain of the first pMOSFET 2-220A is connected to a first output terminal OUTA. A first upper protection diode 2-226A is connected between the drain and the source of the first pMOSFET 2-220A.

When the first positive gate signal PGA signal has a high voltage value, the first pMOSFET 2-220A is turned off and no current flows through the first pMOSFET 2-220A. When the first positive gate signal PGA has a low voltage value, the first pMOSFET 2-220A is turned on and current may flow from the supply voltage VDD through the first pMOSFET 2-220A to the first output terminal OUTA.

The first reference voltage signal $V_{REFA}$ is connected to a negative input of a first differential amplifier 2-230A. A positive input of the first differential amplifier 2-230A is connected to the first output terminal OUTA through a voltage divider, which includes a first upper resistor 2-232A and a first lower resistor 2-234A. A first end of the first upper resistor 2-232A is connected to the first output terminal OUTA. A second end of the first upper resistor 2-232A is connected to a first end of the first lower resistor 2-234A and to the positive input of the first differential amplifier 2-230A. A second end of the first lower resistor 2-234A is connected to ground.

An output of the first differential amplifier 2-230A is connected to a gate of a first n-Channel MOS Field-Effect Transistor (nMOSFET) 2-222A. A drain of the first nMOSFET 2-222A is connected to the first output terminal OUTA. A source of the first nMOSFET 2-222A is connected to ground through the current sense resistor 2-108. A first lower protection diode 2-228A is connected between the drain and the source of the first nMOSFET 2-222A.

The first differential amplifier 2-230A, first nMOSFET 2-222A, first upper resistor 2-232A, and first lower resistor 2-234A operate as a feedback circuit to maintain the first output terminal OUTA at a first target output voltage $V_{OUTA}$ according to Equation 1, wherein $V_{RA}$ is a voltage of the first reference voltage signal $V_{REFA}$, $R_{UA}$ is a resistance value of the first upper resistor 2-232A and $R_{LA}$ is a resistance value of the first lower resistor 2-234A:

$$V_{OUTA} = V_{RA} \cdot \frac{R_{UA} + R_{LA}}{R_{LA}}. \qquad \text{(Equation 1)}$$

When the first reference voltage signal $V_{REFA}$ has an off voltage value $V_{OFF}$ for which the corresponding first target output voltage $V_{OUTA}$ is substantially equal to or greater than the supply voltage VDD, the first differential amplifier 2-230A turns the first nMOSFET 2-222A off and no current flows through the first nMOSFET 2-222A. When the first reference voltage signal $V_{REFA}$ has an on voltage value $V_{ON}$ for which the corresponding first target output voltage $V_{OUTA}$ is substantially equal to or lower than 0V, the first differential amplifier 2-230A turns the first nMOSFET 2-222A on.

In an embodiment, the motor control circuit 1-102 of FIG. 1 operates the first nMOSFET 2-222A as a switch by driving the first reference voltage signal $V_{REFA}$ to the off and on voltage values $V_{OFF}$ and $V_{ON}$. In an embodiment, the motor control circuit 1-102 floats the first output terminal OUTA by driving the first positive gate signal PGA signal to the high voltage value and the first reference voltage signal $V_{REFA}$ to the off voltage values $V_{OFF}$.

The second driver circuit 2-104B is substantially identical to the first driver circuit 2-104A. The second driver circuit 2-104B receives a second positive gate signal PGB and a second reference voltage signal $V_{REFB}$. These signals may be included in the second control signal CTRLB of FIG. 1A.

The second driver circuit 2-104B includes a second pMOSFET 2-220B, a second nMOSFET 2-222B, second upper and lower protection diodes 2-226B and 2-228B, a second differential amplifier 2-230B, and second upper and lower resistors 2-232B and 2-234B. As shown in FIG. 2, the components of the second driver circuit 2-104B are connected in a similar manner as the components of the first driver circuit 2-104A.

When the second positive gate signal PGB signal has a high voltage value, the second pMOSFET 2-220B is turned off and no current flows through the second pMOSFET 2-220B. When the second positive gate signal PGB has a low voltage value, the second pMOSFET 2-220B is turned on and current may flow from the supply voltage VDD through the second pMOSFET 2-220B to a second output terminal OUTB.

The second differential amplifier 2-230B, second nMOSFET 2-222B, second upper resistor 2-232B, and second lower resistor 2-234B operate as a feedback circuit to maintain the second output terminal OUTB at a second target output voltage $V_{OUTB}$ according to Equation 2, wherein $V_{RB}$ is a voltage of the second reference voltage signal $V_{REFB}$, $R_{UB}$ is a resistance value of the second upper resistor 2-232B and $R_{LB}$ is a resistance value of the second lower resistor 2-234B:

$$V_{OUTB} = V_{RB} \cdot \frac{R_{UB} + R_{LB}}{R_{LB}}. \qquad \text{(Equation 2)}$$

When the second reference voltage signal $V_{REFB}$ has an off voltage value $V_{OFF}$ for which the corresponding second target output voltage $V_{OUTB}$ is substantially equal to or greater than the supply voltage VDD, the second differential amplifier 2-230B turns the second nMOSFET 2-222B off and no current flows through the second nMOSFET 2-222B. When the second reference voltage signal $V_{REFB}$ has an on voltage value $V_{ON}$ for which the corresponding second target output voltage $V_{OUTB}$ is substantially equal to or lower than 0V, the second differential amplifier 2-230B turns the second nMOSFET 2-222B on.

In an embodiment, the motor control circuit 1-102 of FIG. 1 operates the second nMOSFET 2-222B as a switch by driving the second reference voltage signal $V_{REFB}$ to the off and on voltage values $V_{OFF}$ and $V_{ON}$. In an embodiment, the motor control circuit 1-102 floats the second output terminal OUTB by driving the second positive gate signal PGB signal to the high voltage value and the second reference voltage signal $V_{REFB}$ to the off voltage values $V_{OFF}$.

The third driver circuit 2-104C receives a third positive gate signal PGC and a third negative gate signal NGC. These signals may be included in the third control signal CTRLC of FIG. 1A.

The third positive gate signal PGC is connected to a gate of a third pMOSFET 2-220C. A source of the third pMOSFET 2-220C is connected to a supply voltage VDD. A drain of the third pMOSFET 2-220C is connected to a third output terminal OUTC. A third upper protection diode 2-226C is connected between the drain and the source of the third pMOSFET 2-220C.

The third negative gate signal NGC is connected to a gate of a third nMOSFET 2-222C. A source of the third nMOSFET 2-222C is connected to a ground through the current sense resistor 2-108. A drain of the third nMOSFET 2-222C is connected to a third output terminal OUTC. A third lower protection diode 2-228C is connected between the drain and the source of the third nMOSFET 2-222C.

When the third positive gate signal PGC signal has a high voltage value, the third pMOSFET 2-220C is turned off and no current flows through the third pMOSFET 2-220C. When the third positive gate signal PGC has a low voltage value, the third pMOSFET 2-220C is turned on and current may flow from the supply voltage VDD through the third pMOSFET 2-220C to the third output terminal OUTC.

When the third negative gate signal NGC signal has a low voltage value, the third nMOSFET 2-222C is turned off and no current flows through the third nMOSFET 2-222C. When the third negative gate signal NGC has a high voltage value, the third nMOSFET 2-222C is turned on and current may flow from the third output terminal OUTC through the third nMOSFET 2-222C and the current sense resistor 2-108 to ground.

In another embodiment, the third driver circuit 2-104C may be substantially identical to the first and second driver circuits 2-104A and 2-104B and may operate in a substantially identical manner.

In another embodiment, a shared feedback circuit comprising an upper resistor, a lower resistor, and a differential amplifier may be used instead of using resistors and a differential amplifier in each of the first and second driver circuits 2-104A and 2-104B, and first and second switches may be used to connect an input of the shared feedback circuit to the first and second output terminals OUTA and OUTB and an output of the shared feedback circuit to the gates of the first and second nMOSFETs 2-222A and 2-222B, respectively. The first and second switches may be controlled according to switch control signals from a motor control circuit. In an embodiment, third switches may be used to connect the input of the shared feedback circuit to the third output terminal OUTC and the output of the shared feedback circuit to the gate of the third nMOSFETs 2-222C.

Although the embodiment of the driver circuits described above includes nMOSFETs and pMOSFETs, embodiments are not limited thereto. A person of skill in the art would understand that any of a variety of three-terminal electronic devices or circuits able to amplify and switch electrical signals could be used instead of the nMOSFETs and pMOSFETs described above, including Junction Field-Effect Transistors (JFETs), bipolar junction transistors (BJTs), and combinations thereof.

Figure 3:
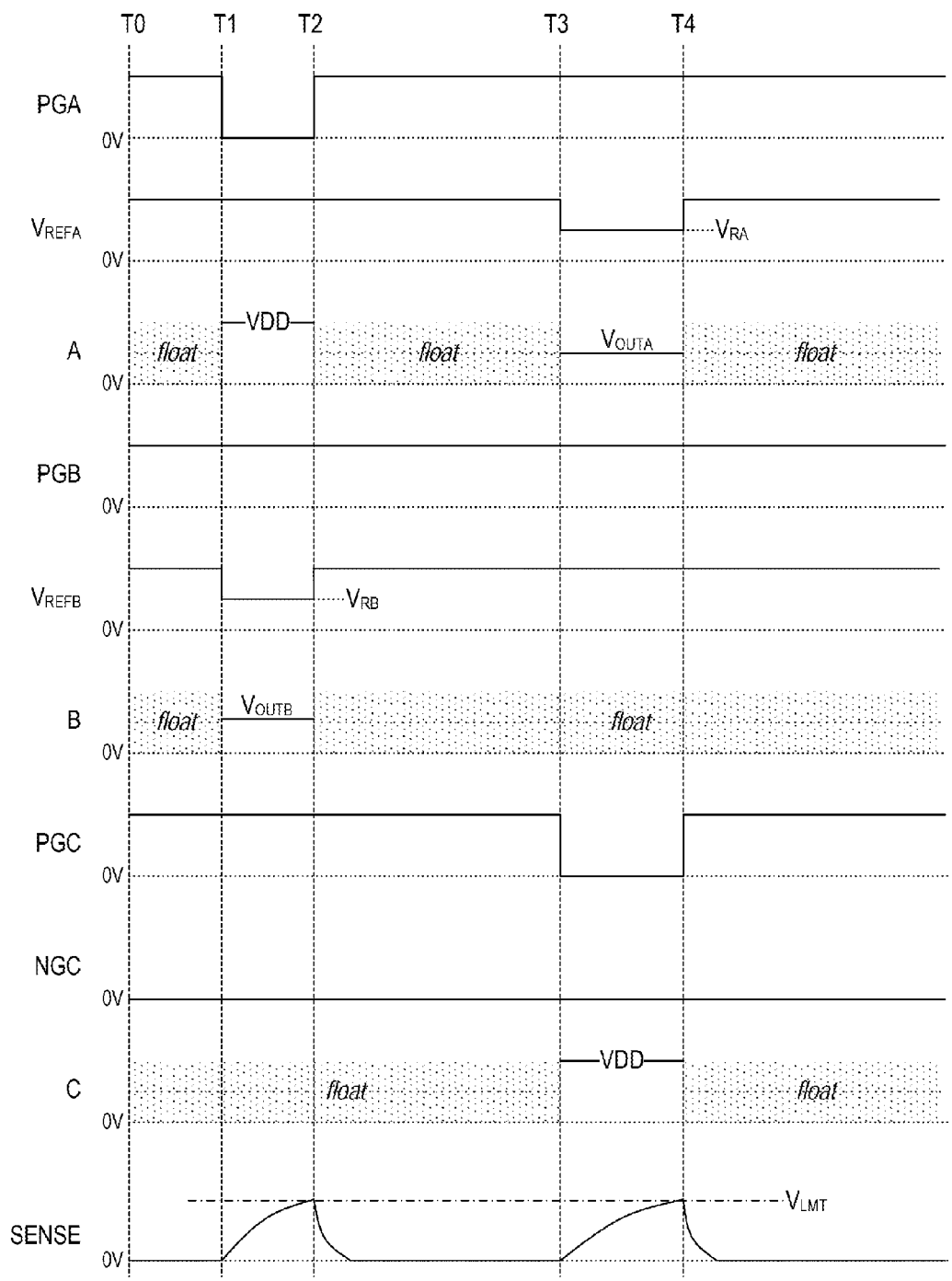
FIG. 3 is a waveform diagram illustrating an operation of the three-phase BLDC motor system of FIG. 1A according to an embodiment.

FIG. 3 is a waveform diagram illustrating an operation of the three-phase BLDC motor system of FIG. 2 according to an embodiment.

At an initial (zeroth) time T0 the first, second and third positive gate signals PGA, PGB, and PGC have a value equal to the supply voltage VDD, and accordingly the first, second and third pMOSFETs 2-220A, 2-220B, and 2-220C are turned off. The third negative gate signal NGC has a value of 0V, and accordingly the third nMOSFET 2-222C is turned off. The first and second reference voltage signals $V_{REFA}$ and $V_{REFB}$ have a value equal to the supply voltage VDD, and accordingly the first and second nMOSFETs 2-222A and 2-222B are turned off.

Because all of the first, second and third pMOSFETs 2-220A, 2-220B, and 2-220C and the first, second and third nMOSFETs 2-222A, 2-222B, and 2-222C are turned off, the first, second, and third terminals A, B, and C of the motor 2-110 float, and no current flows from any of the first, second, and third driver circuits 2-104A, 2-104B, and 2-104C through the first, second, and third windings 2-112A, 2-112B, and 2-112C of the motor 2-110.

At a first time T1, the first positive gate signal PGA is driven to a value of 0V and the second reference voltage signal $V_{REFB}$ is driven to a value of $V_{RB}$ that is less than the supply voltage VDD. The first pMOSFET 2-220A is turned on and the first terminal A is driven to the supply voltage VDD. The second driver circuit 2-104B operates to drive the second terminal B to the second target voltage output $V_{OUTB}$ according to Equation 2, above. The second target voltage output $V_{OUTB}$ is substantially less than the supply voltage VDD and substantially greater than 0V. For example, in an embodiment, the supply voltage VDD has a nominal value of 12 volts and the second driver circuit 2-104B is configured to produce a second target voltage output $V_{OUTB}$ of 10, 8, 6, or 4 volts according to a model of the motor 2-110.

A first current $I_1$ flows through the first and second windings 2-112A and 2-112B according to a first inductance $L_{AB}$ of the first and second windings 2-112A and 2-112B and a first voltage difference $D_{V1}$ between the supply voltage VDD and the second target voltage output $V_{OUTB}$. The first current $I_1$ increases over time according to the relationship shown in Equation 3, wherein $$\frac{dI_1}{dt}$$

is the change in the first current $I_1$ over time:

$$\frac{dI_1}{dt} = \frac{D_{V1}}{L_{AB}}. \quad \text{(Equation 3)}$$

The first current $I_1$ also flows through the current sense resistor 2-108 and produce a voltage value of a current sense signal SENSE according to the value of the first current $I_1$ flowing through the first and second windings 2-112A and 2-112B and the resistance value of the current source resistor 2-108.

At a second time T2, the voltage value of the current sense signal SENSE reaches a predetermined sense limit value $V_{LMT}$. The first inductance $L_{AB}$ of the first and second windings 2-112A and 2-112B may be calculated according to a first time interval between the first time T1 and the second time T2, corresponding to a rise time of the third current $I_1$, and the difference $D_{V1}$ between the supply voltage VDD and the second target voltage output $V_{OUTB}$. Since the difference between $D_{V1}$ between the supply voltage VDD and the second target voltage output $V_{OUTB}$ is smaller than a difference between the supply voltage VDD and a ground voltage, the slope of the rising current $I_1$ during the first time interval may be reduced compared to when the power supply voltage VDD and the ground voltage are provided to the first and second motor terminals A and B. As a result, the magnitude of the current $I_1$ at the second time T2 may be also reduced compared to when the difference between the power supply voltage VDD and the ground voltage is applied across the first and second windings 1-112A and 1-112B. Furthermore, by reducing the slope of the current $I_1$, an amount of acoustic noise produced by the motor 2-110 during inductive sense may be reduced.

Throughout the first time interval starting at the first time T1 and ending at the second time T2, the first terminal A remains driven to the supply voltage VDD and the second terminal B remains driven to the second target voltage output $V_{OUTB}$. In an embodiment, the duration of the first time interval may be between 40 and 120 microseconds.

After the current sense signal SENSE reaches the predetermined sense limit value $V_{LMT}$ at the second time T2, the first positive gate signal PGA and the second reference voltage signal $V_{REFB}$ are driven to the supply voltage VDD or to another sufficiently high voltage. The first pMOSFET 2-220A and the second nMOSFET 2-222B are turned off, the first, second, and third terminals A, B, and C of the motor 2-110 float, and the first current $I_1$ through the first and second windings 2-112A and 2-112B decays to zero. The voltage that the second reference voltage signal $V_{REFB}$ is driven to in order to turn off the second nMOSFET 2-222B may be substantially less than the supply voltage VDD.

At a third time T3, the third positive gate signal PGC is driven to a value of 0V and the first reference voltage signal $V_{REFA}$ is driven to a value of $V_{RA}$ that is less than the supply voltage VDD. The third pMOSFET 2-220C is turned on and the third terminal C is driven to the supply voltage VDD. The first driver circuit 2-104A operates to drive the first terminal A to the first target voltage output $V_{OUTA}$ according to Equation 1, above. The first target voltage output $V_{OUTA}$ is substantially less than the supply voltage VDD and substantially greater than 0V. In an embodiment, the first target voltage output $V_{OUTA}$ is substantially equal to the second target voltage output $V_{OUTB}$.

A second current $I_2$ flows through the first and third windings 2-112A and 2-112C according to a second inductance $L_{AC}$ of the first and third windings 2-112A and 2-112C and a second voltage difference $D_{V2}$ between the supply voltage VDD and the first target voltage output $V_{OUTA}$. The second current $I_2$ increases over time according to the relationship shown in Equation 4, wherein $$\frac{dI_2}{dt}$$

is the change in the second current $I_2$ over time:

$$\frac{dI_2}{dt} = \frac{D_{V2}}{L_{AC}}. \qquad \text{(Equation 4)}$$

The second current $I_2$ also flows through the current sense resistor 2-108 and produce a voltage value of a current sense signal SENSE according to the value of the second current $I_2$ flowing through the first and third windings 2-112A and 2-112C.

At a fourth time T4, the voltage value of the current sense signal SENSE reaches the predetermined sense limit value $V_{LMT}$. The second inductance $L_{AC}$ of the first and third windings 2-112A and 2-112C may be calculated according to a second time interval between the first time T3 and the second time T4, corresponding to a rise time of the second current $I_2$, and the difference $D_{V2}$ between the supply voltage VDD and the first target voltage output $V_{OUTA}$.

Throughout the second time interval starting at the third time T3 and ending at the fourth time T4, the first terminal A remains driven to the first target voltage output $V_{OUTA}$ and the third terminal C remains driven to the supply voltage VDD. After the current sense signal SENSE reaches the predetermined sense limit value $V_{LMT}$ at the fourth time T4, the third positive gate signal PGC and the first reference voltage signal $V_{REF4}$ are driven to the supply voltage VDD or to another sufficiently high voltage. The third pMOSFET 2-220C and the first nMOSFET 2-222A are turned off, the first, second, and third terminals A, B, and C of the motor 2-110 float, and the second current $I_2$ through the first and third windings 2-112A and 2-112C decays to zero. The voltage that the first reference voltage signal $V_{REF4}$ is driven to in order to turn off the first nMOSFET 2-222A may be substantially less than the supply voltage VDD.

A person of skill in the art in light of the teachings and disclosures herein would understand that the first inductance $L_{AB}$ and the second inductance $L_{AC}$ vary according to a position of a rotor of the motor 2-110. As a result, the position of a rotor of the motor 2-110 may be determined according to the first time interval between the first time T1 and the second time T2, the second time interval between the third time T3 and the fourth time T4, the supply voltage VDD, and the first and second target voltage outputs $V_{OUTA}$ and $V_{OUTB}$.

In another embodiment, additional combinations of terminals may also be provided with voltages in order to measure additional inductances of the motor 2-110. A person of skill in the art in light of the teachings and disclosures herein would understand how to use the additional measurements along with the measurements according to the first and second inductances $L_{AB}$ and $L_{AC}$ to determine the position of the rotor of the motor 2-110.

For example, in an embodiment, the third driver circuit 2-104C may provide the supply voltage VDD to the third terminal C while the second driver circuit 2-104B provides the second target voltage output $V_{OUTB}$ to the second terminal B, and a measurement according to a third inductance of the second and third windings 2-112B and 2-112C may be performed.

In an embodiment, the second driver circuit 2-104B may provide the supply voltage VDD to the second terminal B while the first driver circuit 2-104A provides the first target voltage output $V_{OUTA}$ to the first terminal A, and a measurement according to a fourth inductance of the first and second windings 2-112A and 2-112B may be performed. Because a current generated by providing the supply voltage VDD to the second terminal B and the first target voltage output $V_{OUTA}$ to the first terminal A would flow through the first and second windings 2-112A and 2-112B in a direction opposite to the direction of the first current $I_1$ shown in FIG. 2, and because a magnetic pole of the rotor may be in proximity to one or more of the first and second windings 2-112A and 2-112B, the fourth inductance may have a magnitude different than the first inductance $L_{AB}$ described above.

In an embodiment, wherein the third driver circuit 2-104C is substantially identical to the second driver circuit 2-104B, the second driver circuit 2-104B may provide the power supply voltage to the second terminal B while the third driver circuit 2-104C provides a third target voltage output to the second terminal C. The third target voltage output is substantially less than the supply voltage VDD and substantially greater than 0V. A measurement according to an inductance of the second and third windings 2-112B and 2-112C may then be performed.

By providing across terminals of the motor 2-110 the first and second voltage differences $D_{V1}$ and $D_{V2}$ that are substantially less than the difference between the supply voltage VDD and ground, the position of the rotor of the motor 2-110 may be reliably determined using reduced currents through the windings of the motor 2-110.

A person of skill in the art would also understand that the driver circuits described above may include additional circuits to those described in the present disclosure. For example, while an embodiment may use the above-described circuits to drive the windings of the motor during all stages of the operation of the motor, another embodiment may include additional circuits to drive the windings of the motor after the position of the rotor has been established.

Figure 4:
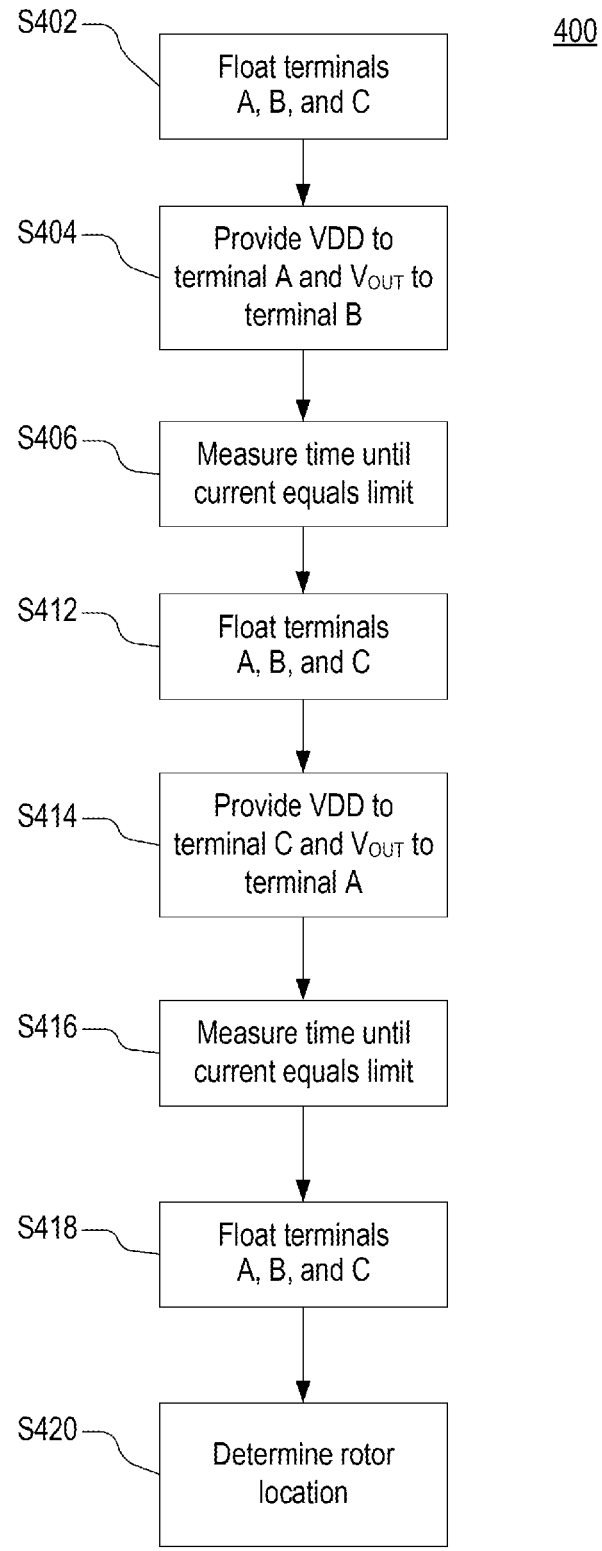
FIG. 4 is a flowchart of a process of determining a rotor position of a three-phase BLDC motor according to an embodiment.

FIG. 4 is a flowchart of a process 400 of determining a rotor position of a three-phase BLDC motor according to an embodiment.

At S402, first, second, and third terminals A, B, and C of a motor are allowed to float.

At S404, at a first time T1, a first supply voltage is provided to the first terminal A and a target voltage $V_{OUT}$ is provided to the second terminal B. A first current flowing from the first terminal A to the second terminal B is measured. In an embodiment, the current is measured using a voltage drop across a current sensing resistor.

The first supply voltage and a second supply voltage are used to cause the motor to rotate after an initial startup phase, and the target voltage $V_{OUT}$ is voltage having a value between the first and second supply voltages. In an embodiment, the first supply voltage is a power supply voltage and the second supply voltage is a ground.

In an embodiment, the first supply voltage is greater than the second supply voltage and the target voltage $V_{OUT}$ is substantially less than the first supply voltage and substantially greater than the second supply voltage. In another embodiment, the first supply voltage is less than the second supply voltage and the target voltage $V_{OUT}$ is substantially greater than the first supply voltage and substantially less than the second supply voltage.

At S406, when the first current reaches a predetermined limit at a second time T2, a first time interval between the first time T1 and the second time T2 is determined.

At S412, after the second time T2, the first, second, and third terminals A, B, and C of a motor are allowed to float, and the first current decays to substantially zero.

At S414, at a third time T3, the first supply voltage is provided to the third terminal C and the target voltage $V_{OUT}$ is provided to the first terminal A. A second current flowing from the third terminal C to the first terminal A is measured.

At S416, when the second current reaches the predetermined limit at a fourth time T4, a second time interval between the third time T3 and the fourth time T4 is determined.

At S418, after the fourth time T4, the first, second, and third terminals A, B, and C of a motor are allowed to float, and the second current decays to substantially zero.

At S420, the location of a rotor of the motor is determined according to the first and second time intervals.

In other embodiments, the first supply voltage and the target voltage $V_{OUT}$ are further applied in turn to other combinations of the first, second, and third terminals A, B, and C, additional time intervals for additional currents to reach the predetermined limit are determined, and the location of the rotor of the motor is determined according to the first, second, and additional time intervals.

Figure 5:
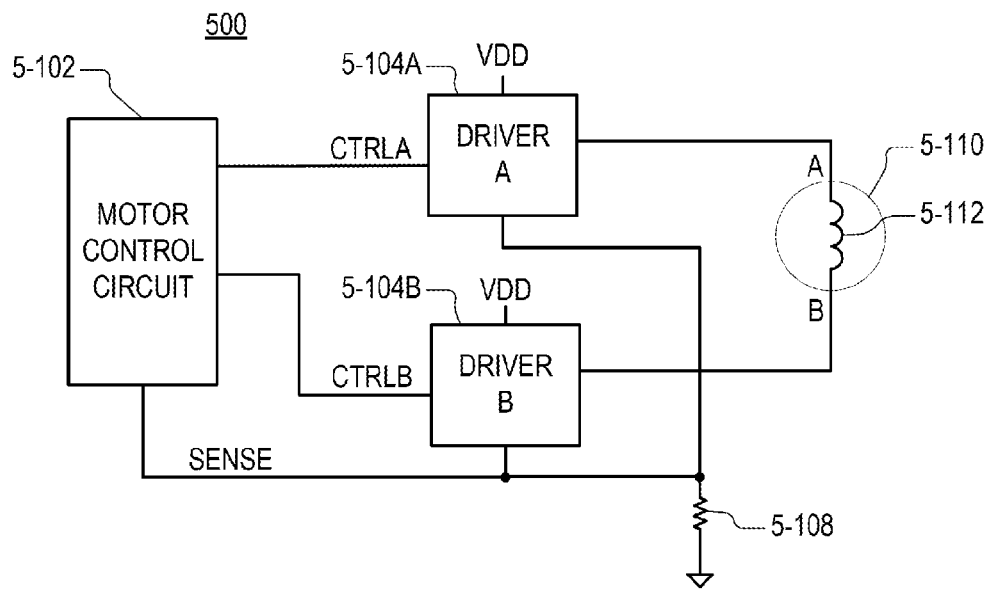
FIG. 5 illustrates a single-phase BLDC motor system according to an embodiment.

FIG. 5 illustrates a single-phase Brush-Less Direct Current (BLDC) motor system 500 according to an embodiment. The BLDC motor system 500 includes a motor control circuit 5-102, first and second driver circuits 5-104A and 5-104B, a current sense resistor 5-108, and a single-phase BLDC motor 5-110.

The motor control circuit 5-102 provides first and second control signals CTRLA and CTRLB to the first and second driver circuits 5-104A and 5-104B, respectively. In an embodiment, each of the first and second control signals CTRLA and CTRLB includes a plurality of signals. The motor control circuit 5-102 senses a current flow through the first and second driver circuits 5-104A and 5-104B by measuring a voltage across the current sense resistor 5-108.

The first and second driver circuits 5-104A and 5-104B are each connected to a supply voltage VDD and connected to a ground through the current sense resistor 5-108. The first and second driver circuits 5-104A and 5-104B control first and second signals supplied to first and second motor terminals A and B of the motor 5-110, respectively. The current sense resistor 5-108 is used to produce a current sense signal SENSE that is monitored by the motor control circuit 5-102.

The motor 5-110 includes a winding 5-112 having a first and second ends connected to the first and second motor terminals A and B, respectively. The motor 5-110 also includes a rotor (not shown in FIG. 5), which may include one or more permanent magnets.

A person of skill in the art in light of the teachings and disclosures would understand that the BLDC motor system 500 may further include other circuits, which are omitted in the interest of brevity. In an embodiment, all or part of the motor control circuit 5-102 and the first and second driver circuits 5-104A and 5-104B are provided in an integrated circuit.

Figure 6:
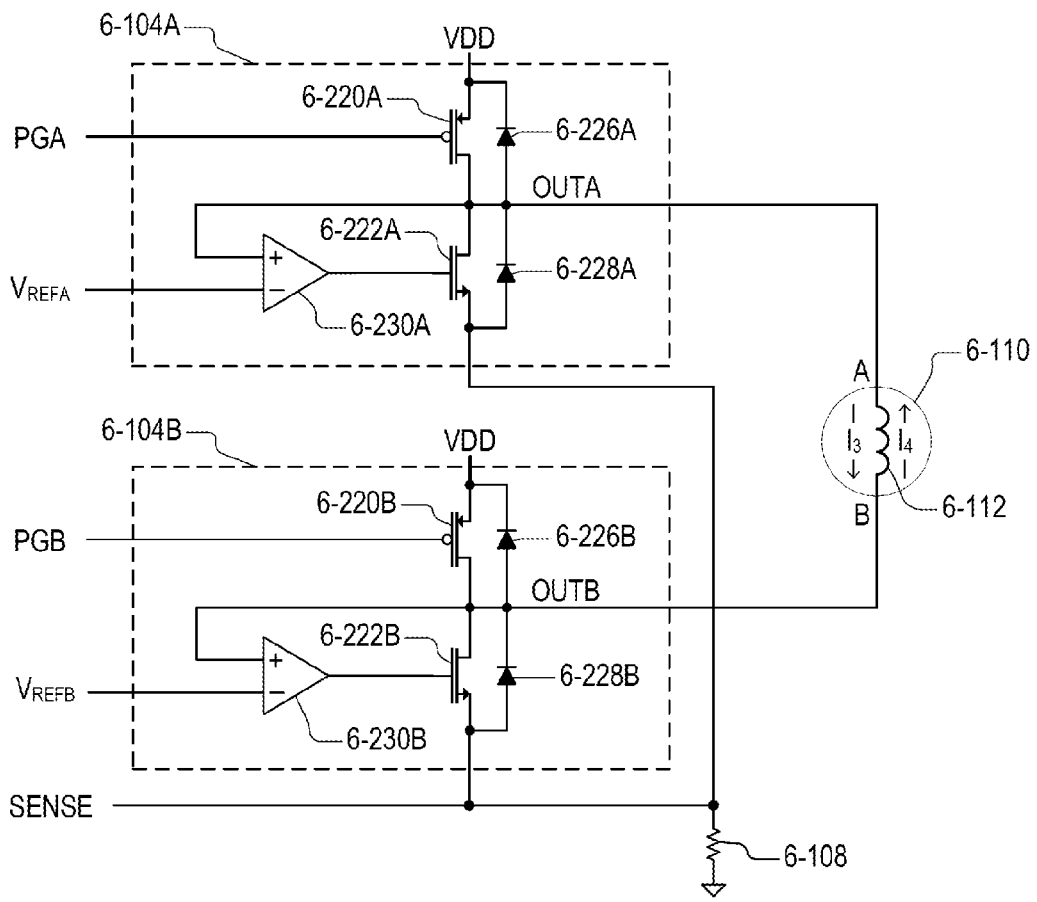
FIG. 6 illustrates driver circuits of the single-phase BLDC motor system of FIG. 5 according to an embodiment.

FIG. 6 illustrates further details of first and second driver circuits 6-104A and 6-104B suitable for use as the first and second driver circuits 5-104A and 5-104B, respectively, of the BLDC motor system 500 of FIG. 5 according to an embodiment.

The first driver circuit 6-104A receives a first positive gate signal PGA and a first reference voltage signal $V_{REFA}$. These signals may be included in the first control signals CTRLA of FIG. 5.

A first pMOSFET 6-220A includes a gate connected to the first positive gate signal PGA, a source connected to a supply voltage VDD, and a drain connected to a first output terminal OUTA. A first upper protection diode 6-226A is connected between the drain and the source of the first pMOSFET 6-220A.

When the first positive gate signal PGA signal has a high voltage value, the first pMOSFET 6-220A is turned off and no current flows through the first pMOSFET 6-220A. When the first positive gate signal PGA has a low voltage value, the first pMOSFET 6-220A is turned on and current may flow from the supply voltage VDD through the first pMOSFET 6-220A to the first output terminal OUTA.

The first reference voltage signal $V_{REFA}$ is connected to a negative input of a first differential amplifier 6-230A. A positive input of the first differential amplifier 6-230A is connected to the first output terminal OUTA.

A first nMOSFET 6-222A has a gate connected to an output of the first differential amplifier 6-230A, a drain connected to the first output terminal OUTA, and a source connected to ground through the current sense resistor 6-108. A first lower protection diode 6-228A is connected between the drain and the source of the first nMOSFET 6-222A.

The first differential amplifier 6-230A and first nMOSFET 6-222A operate as a feedback circuit to maintain the first output terminal OUTA at a first target output voltage $V_{OUTA}$ substantially equal to a voltage $V_{RA}$ of the first reference voltage signal $V_{REFA}$. When the first target output voltage $V_{OUTA}$ is substantially equal to or greater than the supply voltage VDD, the first differential amplifier 6-230A turns the first nMOSFET 6-222A off and no current flows through the first nMOSFET 6-222A. In an embodiment, the first output terminal OUTA is floated by driving the first positive gate signal PGA to the high voltage value and controlling the first target output voltage $V_{OUTA}$ to be substantially equal to or greater than the supply voltage VDD.

The second driver circuit 6-104B is substantially identical to the first driver circuit 6-104A. The second driver circuit 6-104B receives a second positive gate signal PGB and a second reference voltage signal $V_{REFB}$. These signals may be included in the second control signals CTRLB of FIG. 5.

The second driver circuit 6-104B includes a second pMOSFET 6-220B, a second nMOSFET 6-222B, second upper and lower protection diodes 6-226B and 6-228B, and a second differential amplifier 6-230B. The components of the second driver circuit 6-104B are connected in a similar manner as the components of the first driver circuit 6-104A.

When the second positive gate signal PGB signal has a high voltage value, the second pMOSFET 6-220B is turned off and no current flows through the second pMOSFET 6-220B. When the second positive gate signal PGB has a low voltage value, the second pMOSFET 6-220B is turned on and current may flow from the supply voltage VDD through the second pMOSFET 6-220B to a second output terminal OUTB.

The second differential amplifier 6-230B and second nMOSFET 6-222B operate as a feedback circuit to maintain the second output terminal OUTB at a second target output voltage $V_{OUTB}$ substantially equal to a voltage $V_{RB}$ of the first reference voltage signal $V_{REFB}$. When the second target output voltage $V_{OUTB}$ is substantially equal to or greater than the supply voltage VDD, the second nMOSFET 6-222B is turned off and no current flows through the second nMOSFET 6-222B. In an embodiment, the second output terminal OUTB is floated by driving the second positive gate signal PGB to the high voltage value and controlling the second target output voltage $V_{OUTB}$ to be substantially equal to or greater than the supply voltage VDD.

In another embodiment, a shared differential amplifier is used instead of the first and second differential amplifiers 6-230A and 6-230B. A negative input of the shared differential amplifier receives a shared target voltage. First and second switches connect a positive input of the shared differential amplifier to the first and second output terminals OUTA and OUTB, respectively, and connect an output of the shared differential amplifier to the gates of the first and second nMOSFETs 2-222A and 2-222B, respectively. The first and second switches may be controlled according to switch control signals from a motor control circuit or according to values of the second and first positive gate signals PGB and PGA, respectively.

FIG. 7 is a waveform diagram illustrating an operation of the single-phase BLDC motor system of FIG. 5 according to an embodiment.

At an initial (zeroth) time T0 the first and second positive gate signals PGA and PGB have a value equal to the supply voltage VDD, and accordingly the first and second pMOSFETs 6-220A and 6-220B are turned off. The first and second reference voltage signals $V_{REFA}$ and $V_{REFB}$ have a value equal to the supply voltage VDD, and accordingly the first and second nMOSFETs 6-222A and 6-222B are turned off.

Because all of the first and second pMOSFETs 6-220A and 6-220B and the first and second nMOSFETs 6-222A and 6-222B are turned off, the first and second terminals A and B of the motor 6-110 float, and no current flows through the winding 6-112 of the motor 6-110.

At a first time T1, the first positive gate signal PGA is driven to a value of 0V and the second reference voltage signal $V_{REFB}$ is driven to a voltage $V_{RB}$ that is less than the supply voltage VDD. The first pMOSFET 6-220A is turned on and the first terminal A is driven to the supply voltage VDD. The second driver circuit 6-104B operates to drive the second terminal B to the second target voltage output $V_{OUTB}$ substantially equal to the voltage $V_{RB}$. The second target voltage output $V_{OUTB}$ is substantially less than the supply voltage VDD and substantially greater than 0V.

A third current $I_3$ flows through the winding 6-112 according to a first inductance $L_{AB}$ of the winding 6-112 and a third voltage difference $D_{V3}$ between the supply voltage VDD and the second target voltage output $V_{OUTB}$. The third current $I_3$ increases over time according to the relationship shown in Equation 3, wherein $$\frac{dI_3}{dt}$$

is the change in the third current $I_3$ over time:

$$\frac{dI_3}{dt} = \frac{D_{V3}}{L_{AB}}. \quad \text{(Equation 3)}$$

The third current $I_3$ also flows through the current sense resistor 6-108 and produce a voltage value of a current sense signal SENSE according to the value of the third current $I_3$ flowing through the winding 6-112 and the resistance value of the current source resistor 6-108.

At a second time T2, the voltage value of the current sense signal SENSE reaches a predetermined sense limit value $V_{LMT}$. The first inductance $L_{AB}$ of the winding 6-112 may be calculated according to a first time interval between the first time T1 and the second time T2, corresponding to a rise time of the third current $I_3$, and the difference $D_{V3}$ between the supply voltage VDD and the second target voltage output $V_{OUTB}$.

Throughout the first time interval starting at the first time T1 and ending at the second time T2, the first terminal A remains driven to the supply voltage VDD and the second terminal B remains driven to the second target voltage output $V_{OUTB}$. After the current sense signal SENSE reaches the predetermined sense limit value $V_{LMT}$ at the second time T2, the first positive gate signal PGA and the second reference voltage signal $V_{REFB}$ are driven to the supply voltage VDD. The first pMOSFET 6-220A and the second nMOSFET 6-222B are turned off, the first and second terminals A and B of the motor 6-110 float, and the third current $I_3$ through the winding 6-112 decays to zero.

At a third time T3, the second positive gate signal PGB is driven to a value of 0V and the first reference voltage signal $V_{REFA}$ is driven to a value of $V_{RA}$ that is less than the supply voltage VDD. The second pMOSFET 6-220B is turned on and the second terminal B is driven to the supply voltage VDD. The first driver circuit 6-104A operates to drive the first terminal A to the first target voltage output $V_{OUTA}$ substantially equal to the voltage $V_{RA}$. The first target voltage output $V_{OUTA}$ is substantially less than the supply voltage VDD and substantially greater than 0V. In an embodiment, the first target voltage output $V_{OUTA}$ is substantially equal to the second target voltage output $V_{OUTB}$.

A fourth current $I_4$ flows through the winding 6-112 according to a second inductance $L_{BA}$ of the winding 6-112 and a fourth voltage difference $D_{V4}$ between the supply voltage VDD and the first target voltage output $V_{OUTA}$. Because the fourth current $I_4$ flows in a direction opposite to the direction of the third current $I_3$, when a magnetic pole of the rotor of the motor 6-110 is in proximity to the winding 6-112, the second inductance $L_{BA}$ may be different than the first inductance $L_{AB}$. The fourth current $I_4$ increases over time according to the relationship shown in Equation 4, wherein $$\frac{dI_4}{dt}$$

is the change in the fourth current $I_4$ over time:

$$\frac{dI_4}{dt} = \frac{D_{V4}}{L_{BA}}. \quad \text{(Equation 4)}$$

The fourth current $I_4$ also flows through the current sense resistor 6-108 and produce a voltage value of a current sense signal SENSE according to the value of the fourth current $I_4$ flowing through the winding 6-112 and the resistance value of the current source resistor 6-108.

At a fourth time T4, the voltage value of the current sense signal SENSE reaches the predetermined sense limit value $V_{LMT}$. The second inductance $L_{BA}$ of the winding 6-112 may be calculated according to a second time interval between the first time T3 and the second time T4, corresponding to a rise time of the fourth current $I_4$, and the difference $D_{V4}$ between the supply voltage VDD and the first target voltage output $V_{OUTA}$.

Throughout the second time interval starting at the third time T3 and ending at the fourth time T4, the first terminal A remains driven to the second target voltage output $V_{OUTB}$ and the second terminal B remains driven to the supply voltage VDD. After the current sense signal SENSE reaches the predetermined sense limit value $V_{LMT}$ at the fourth time T4, the second positive gate signal PGB and the first reference voltage signal $V_{REFA}$ are driven to the supply voltage VDD. The second pMOSFET 6-220B and the first nMOSFET 6-222A are turned off, the first and second terminals A and B of the motor 6-110 float, and the fourth current $I_4$ through the winding 6-112 decays to zero.

A person of skill in the art in light of the teachings and disclosures herein would understand that the first inductance $L_{AB}$ and the second inductance $L_{BA}$ vary according to a position of a rotor of the motor 6-110. As a result, the position of a rotor of the motor 6-110 may be determined according to the first time interval between the first time T1 and the second time T2, the second time interval between the third time T3 and the fourth time T4, the supply voltage VDD, and the first and second target voltage outputs $V_{OUTA}$ and $V_{OUTB}$.

By providing across terminals of the motor 6-110 the third and fourth voltage differences $D_{V3}$ and $D_{V3}$ that are substantially less than the difference between the supply voltage VDD and ground, the position of the rotor of the motor 6-110 may be reliably determined using reduced currents through the windings of the motor 6-110.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. An apparatus comprising:
   a driver circuit including an output terminal and configured to receive first and second supply voltages and a control signal, and generate a target voltage on the output terminal according to the control signal, the target voltage being between the first and second supply voltages and substantially different from each of the first and second supply voltages; and
   a motor control circuit configured to generate the control signal, and measure a rise time of a current of the driver circuit during a period of time in which the output terminal is at the target voltage;
   wherein the control signal includes a first control signal and a second control signal, wherein the driver circuit further includes:
   a first transistor including a first terminal connected to the first supply voltage, a second terminal connected to the output terminal, and a control terminal receiving the first control signal;
   a second transistor including a first terminal connected to the output terminal and a second terminal connected to the second supply voltage; and
   a feedback circuit having a first input connected to the output terminal, a second input receiving the second control signal, and a feedback output connected to a control terminal of the second transistor, and
   wherein the feedback output of the feedback circuit is directly connected to the control terminal of the second transistor.

2. The apparatus of claim 1, wherein the driver circuit is configured to generate the target voltage on the output terminal when the control signal includes a first value, and provide the first supply voltage to the output terminal when the control signal includes a second value.

3. The apparatus of claim 2, wherein the first supply voltage is a positive supply voltage and the second supply voltage is less than the first supply voltage.

4. The apparatus of claim 1, wherein the driver circuit is a first driver circuit, the output terminal is a first output terminal, the rise time is a first rise time, the apparatus further comprising:
   a second driver circuit including a second output terminal and configured to receive the first and second supply voltages and a third control signal, and generate a second target voltage on the second output terminal according to the third control signal, wherein the second target voltage is between the first and second supply voltages and substantially different than each of the first and second supply voltages, and
   wherein the motor control circuit is configured to generate the third control signal, and measure a second rise time of a current of the second driver circuit during a period of time in which the second output terminal is at the second target voltage.

5. The apparatus of claim 4, wherein the second driver circuit is configured to generate the second target voltage on the second output terminal when the third control signal includes a third value, and provide the first supply voltage to the second output terminal when the third control signal includes a fourth value.

6. The apparatus of claim 4, wherein the motor control circuit is configured to determine a position of a rotor of an electric motor according to the first rise time and the second rise time.

7. The apparatus of claim 1, further comprising a Brush-Less Direct-Current (BLDC) motor having a winding connected to the output terminal.

8. The apparatus of claim 1, wherein the apparatus is provided in an integrated circuit.

9. The apparatus of claim 1, wherein the first transistor provides the first supply voltage to the output terminal when the first control signal has a first value, and
   wherein the second transistor and the feedback circuit are configured to generate a target voltage on the output terminal when the second control signal has a second value, the target voltage having a level that is proportional to the second value.

10. An apparatus comprising:
    a first transistor including a first terminal connected to a first supply voltage, a second terminal connected to an output terminal, and a control terminal receiving a first control signal;
    a second transistor including a first terminal connected to the output terminal and a second terminal connected to a second supply voltage; and
    a feedback circuit having a first input connected to the output terminal, a second input receiving a second control signal, and a feedback output connected to a control terminal of the second transistor,
    wherein the first transistor provides the first supply voltage to the output terminal when the first control signal has a first value,
    wherein the second transistor and the feedback circuit are configured to generate a target voltage on the output terminal when the second control signal has a second value,
    wherein the target voltage is between the first and second supply voltages and substantially different from the first and second supply voltages, and wherein the feedback output of the feedback circuit is directly connected to the control terminal of the second transistor.

11. The apparatus of claim 10, wherein the feedback circuit comprises a differential amplifier,
wherein the first input of the feedback circuit is a positive input of the differential amplifier,
wherein the second input of the feedback circuit is a negative input of the differential amplifier.

12. The apparatus of claim 10, further including a voltage divider,
wherein the first input of the feedback circuit is connected to the output terminal through the voltage divider, and
wherein the target voltage has a level that is proportional to the second value.

13. The apparatus of claim 10, wherein the first transistor includes a field effect transistor (FET) having a first channel type, and the second transistor includes a FET have a second channel type, and the first channel type is different from the second channel type.

14. A method comprising:
receiving a first control signal and a second control signal;
providing first and second supply voltages to first and second driver circuits; and
during a time interval:
providing the first supply voltage on an output of the first driver circuit when the first control signal has a first value,
generating a target voltage on an output of the second driver circuit when the second control signal has a second value, and
measuring a rise time of a current flowing between the outputs of the first and second driver circuits;
determining a position of a rotor of an electric motor according to the rise time,
wherein the target voltage is between the first and second supply voltages and substantially different from each of the first and second supply voltages; and
wherein the target voltage has a level that is proportional to the second value.

15. The method of claim 14, wherein the target voltage is a first target voltage, the time interval is a first time interval, the rise time is a first rise time, and the current is a first current, the method further comprising:
during a second time interval:
providing the first supply voltage on the output of the second driver circuit,
generating a second target voltage on the output of the first driver circuit, and
measuring a second rise time of a second current flowing between the outputs of the first and second driver circuits,
wherein the second target voltage is between the first and second supply voltages and substantially different from each of the first and second supply voltages.

16. The method of claim 15, further comprising floating at least one of the output of the first driver and the output of the second driver during a third time interval between the first and second time intervals.

17. The method of claim 14, wherein the target voltage is a first target voltage, the rise time is a first rise time, and the current is a first current, the method further comprising:
providing the first and second supply voltages to a third driver circuit; and
during a second time interval:
providing the first supply voltage on an output of the third driver circuit throughout the entire second time interval,
generating a second target voltage on the output of the first driver circuit throughout the second time interval, and
measuring a second rise time of a second current flowing between the outputs of the first and third driver circuits,
wherein the second target voltage is between the first and second supply voltages and substantially different than each of the first and second supply voltages.

18. The method of claim 17, further comprising:
floating the output of the third driver circuit throughout the first time interval; and
floating the output of the second driver circuit throughout the second time interval.

* * * * *